(12) United States Patent
Marya et al.

(10) Patent No.: US 12,577,414 B2
(45) Date of Patent: Mar. 17, 2026

(54) WATER-SENSITIVE SMART COATING FOR FLOW AND CORROSION TRACKING

(71) Applicant: Schlumberger Technology Corporation, Sugar Land, TX (US)

(72) Inventors: Manuel Marya, Sugar Land, TX (US); Alireza Zolfaghari, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/985,489

(22) Filed: Dec. 18, 2024

(65) Prior Publication Data

US 2025/0115772 A1　　Apr. 10, 2025

Related U.S. Application Data

(63) Continuation of application No. 17/447,880, filed on Sep. 16, 2021, now abandoned.

(51) Int. Cl.
*C09D 5/29* (2006.01)
*C09D 7/61* (2018.01)
*C09D 171/00* (2006.01)
*C09D 181/02* (2006.01)
*E21B 41/00* (2006.01)
(Continued)

(52) U.S. Cl.
CPC .................. *C09D 5/29* (2013.01); *C09D 7/61* (2018.01); *C09D 171/00* (2013.01); *C09D 181/02* (2013.01); *E21B 41/00* (2013.01); *C08K 3/22* (2013.01); *C08K 3/38* (2013.01); *G01N 17/04* (2013.01)

(58) Field of Classification Search
CPC .............. E21B 41/00; C09D 5/29; C09D 7/61
See application file for complete search history.

(56) References Cited

U.S. PATENT DOCUMENTS 6,063,486 A　　5/2000　Kobayashi
7,601,280 B2　10/2009　Kinlen
(Continued)

FOREIGN PATENT DOCUMENTS

EP　　　　2973475 A2　　1/2016
WO　　2015105504 A1　　7/2015
WO　　2021028480 A1　　2/2021

OTHER PUBLICATIONS

Ron Lewarchik, 2020, Smart Coatings—The Intelligent Choice, posted in Prospector on Jan. 17, 2020, downloaded from link https://knowledge.ulprospector.com/10185/pc-smart-coatings-the-intelligent-choice/ (4 pages).
(Continued)

*Primary Examiner* — Shane Bomar
(74) *Attorney, Agent, or Firm* — Jeffrey D. Frantz

(57) ABSTRACT

A material composition may include one or more polymeric materials. The material composition may also include one or more inorganic particles comprising oxides, carbonates, sulfides, or any combination thereof. Further, the material composition may include one or more metal particles that produce a detectable change in an electrical property or an optical property based on a reaction with at least one of $H_2O$, $CO_2$, or $H_2S$. The one or more inorganic particles and the one or more metal particles may be dispersed within the one or more polymeric materials.

18 Claims, 9 Drawing Sheets

(51) Int. Cl.
    *C08K 3/22*              (2006.01)
    *C08K 3/38*              (2006.01)
    *G01N 17/04*           (2006.01)

(56) References Cited

U.S. PATENT DOCUMENTS

| | | | | |
|---|---|---|---|---|
| 12,449,349 | B2 * | 10/2025 | Marya | G01N 21/25 |
| 2007/0181224 | A1 * | 8/2007 | Marya | B22F 3/10 |
| | | | | 148/420 |
| 2008/0125335 | A1 * | 5/2008 | Bhavsar | B82Y 15/00 |
| | | | | 166/243 |
| 2008/0163673 | A1 | 7/2008 | Attar | |
| 2010/0136359 | A1 | 6/2010 | Weinell | |
| 2010/0209521 | A1 | 8/2010 | Schalkhammer | |
| 2010/0305234 | A1 | 12/2010 | Calle | |
| 2012/0264847 | A1 | 10/2012 | Thorlaksen | |
| 2013/0273288 | A1 | 10/2013 | Luo | |
| 2013/0342824 | A1 | 12/2013 | Ponomarev | |
| 2015/0232998 | A1 | 8/2015 | Colominas Tutusaus | |
| 2015/0283555 | A1 * | 10/2015 | Khe | B82Y 30/00 |
| | | | | 204/547 |
| 2016/0024312 | A1 | 1/2016 | Decker | |
| 2016/0238547 | A1 | 8/2016 | Park | |
| 2019/0194529 | A1 * | 6/2019 | Han | C04B 35/62894 |
| 2022/0242992 | A1 * | 8/2022 | Huang | B33Y 70/10 |
| 2022/0326141 | A1 | 10/2022 | Bargallo | |
| 2023/0086904 | A1 | 3/2023 | Marya | |

OTHER PUBLICATIONS

Innosense Emerging Technologies at https://innosensellc.com/emergingtechnology.html#Sensors, downloaded on Sep. 16, 2021 (22 pages).

List of inorganic pigments at https://en.wikipedia.org/wiki/List_of_inorganic_pigments, downloaded on Sep. 16, 2021 (6 pages).

International Search Report and Written Opinion issued in the PCT Application PCT/US2022/043740 dated Jan. 13, 2023, 10 pages.

* cited by examiner

WATER-SENSITIVE SMART COATING FOR FLOW AND CORROSION TRACKING

CROSS-REFERENCES TO RELATED APPLICATIONS

This application is a continuation of U.S. patent application Ser. No. 17/447,880, entitled "Water-Sensitive Smart Coating for Flow And Corrosion Tracking," filed Sep. 16, 2021, which are hereby incorporated by reference in their entirety for all purposes.

BACKGROUND

The subject matter disclosed herein relates to systems and methods for assessing damage to a mechanical component due to corrosion, and to some extents also erosion and erosion—corrosion. More specifically, the subject matter disclosed herein relates to techniques to create a corrosion detection coating, and assessing a likelihood and/or magnitude of a corrosion damage to subsequently generate a component damage output in a mineral and hydrocarbon extraction, fluid injection, including carbon dioxide or hydrogen underground sequestration.

Machine components may be used in various oil and gas operations, such as midstream operations (e.g., processing, storing, and/or transporting of oil, natural gas, and natural gas liquids) and upstream operations (e.g., exploration, drilling, production, or extraction). During the operation of mechanical components, the mechanical components are typically subjected to a variety of wet environmental conditions that cause corrosion, and in the presence of flow, also erosion and erosion—corrosion. Corrosion in most of its various forms wherein water is present, sometimes essential, is the progressive loss or removal of materials. Combating corrosion, including preventing it, are both major technical and economic challenges, particularly downhole infrastructures of hydrocarbon production or fluid injection systems (e.g., a hydrocarbon production, water injection, gas sequestration systems).

BRIEF DESCRIPTION

Certain embodiments commensurate in scope with the originally filed claims are summarized below. These embodiments are not intended to limit the scope of the present technology, but rather these embodiments are intended only to provide a brief summary of possible forms of the technology. Indeed, the present system and method may encompass a variety of forms that may be similar to or different from the embodiments set forth below.

In certain embodiments, a material composition may include one or more polymeric materials. The material composition may also include one or more inorganic particles comprising oxides, carbonates, sulfides, or any combination thereof. Further, the material composition may include one or more metal particles that produce a detectable change in an electrical property or an optical property based on a reaction with at least one of water ($H_2O$), carbon dioxide ($CO_2$), or hydrogen sulfide ($H_2S$). The one or more inorganic particles and the one or more metal particles may be dispersed within the one or more polymeric materials.

In certain embodiments, a method includes dispersing one or more inorganic particles into one or more polymeric materials, wherein the one or more inorganic particles comprise oxides, carbonates, sulfides, or any combination thereof. The method also includes dispersing one or more metal particles into the one or more polymeric materials, wherein the one or more metal particles produce a detectable change in an electrical property or an optical property based on a reaction with at least one of $H_2O$, $CO_2$, or $H_2S$, and wherein a material composition comprises the one or more polymeric materials, the one or more inorganic particles, and the one or more metal particles.

In certain embodiments, a system includes a surface monitoring system that measures data indicative of a change in surface characteristics of a material composition along the surface. The material composition includes one or more polymeric materials, wherein the one or more polymeric materials. The material composition also includes one or more inorganic particles comprising oxides, carbonates, sulfides, or any combination thereof. Further, the material composition includes one or more metal particles that produce a detectable change in an electrical property or an optical property based on a reaction with at least one of water ($H_2O$), carbon dioxide ($CO_2$), or hydrogen sulfide ($H_2S$). The one or more inorganic particles and the one or more metal particles may be dispersed within the one or more polymeric materials. The surface monitoring system also includes instructions stored on a non-transitory computer-readable medium and executable by a processor to identify the detectable change in the electrical property or the optical property in response to the data and output an indication of the detectable change.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
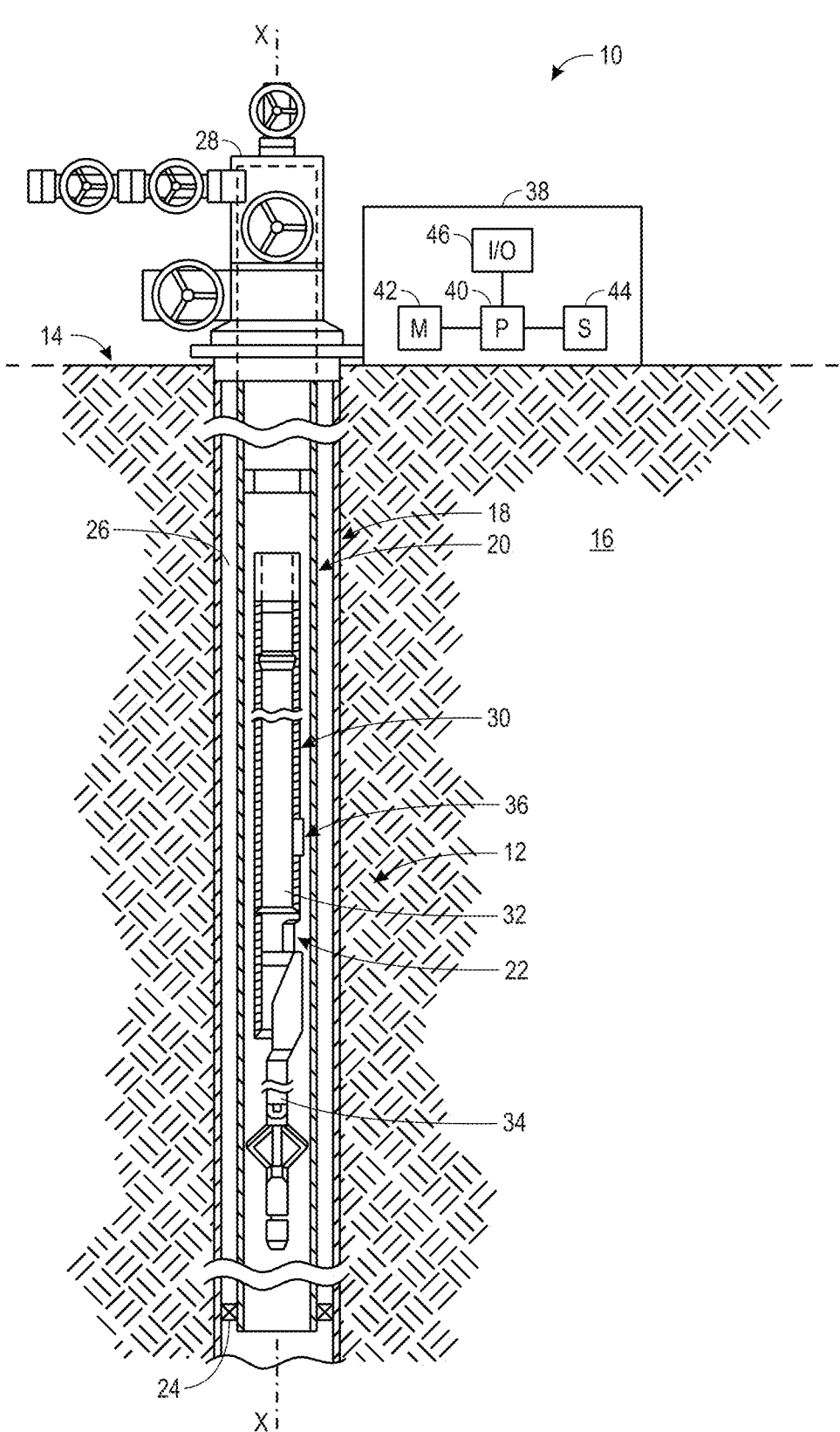
FIG. 1 is a schematic diagram of a wellsite where a corrosion detection coating may be employed, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

In the present context, the term "about" or "approximately" is intended to mean that the values indicated are not exact and that the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As generally discussed above, fluid handling components, such as hydrocarbon extraction components (e.g., machine components, storage tanks, or downhole components) used for oil and gas operations, may incur damage due to flow or corrosion while in operation or being stored. That is, certain downhole conditions may include the presence of corrosive fluids (e.g., water in combination with $CO_2$, $H_2S$, or both, an acid, or a base, or any combination thereof) and, at least in some instances, relatively high temperatures (e.g., 25° C., 50° C., 100° C., greater than 100° C.), and pressures that increase the likelihood of corrosion to the machine component. For example, such downhole conditions may occur during carbon sequestration applications, where well infrastructures may include injector and monitoring wells. When sequestrating $CO_2$ (e.g., during carbon capture and sequestration (CCS)) down a reservoir, pressures may be such that the $CO_2$ is compressed to be in a liquid or a supercritical state. The injected $CO_2$ is normally kept dry (e.g., having less than or equal to approximately 50 ppm, 100 ppm, 200 ppm, 300 ppm, 400 ppm, 500 ppm, or 600 ppm of water). In general, a likelihood of corrosion increases as the concentration of water increases to relatively high ppm concentrations (e.g., greater than 700 ppm, 800 ppm, 900 ppm, or 1000 ppm), where water can be trapped in supercritical $CO_2$ (e.g., Sc $CO_2$). Moreover, as the temperature increases, more water may be stored in Sc $CO_2$, that is indistinguishable from the supercritical $CO_2$. When water is in high concentrations, environmental conditions are created for corrosion to develop. When water is also flown at high velocities, corrosion and potentially erosion start to take place, possibly leading to greater losses of materials. In general, the corrosion may be difficult to detect due to the mechanical component (e.g., a mechanical component of a hydrocarbon extraction system,) being disposed in a position that is difficult to monitor, such as the mechanical component being disposed downhole or being transported on a vehicle.

Accordingly, the present disclosure is directed to techniques for improving the detection of damage to mechanical components by combining or dispersing tracers (e.g., metal particles and/or inorganic particles) into an engineering polymer to form a flow and/or corrosion detection coating (e.g., corrosion detection coating, flow detection coating, or both) and applying the corrosion detection coating onto a surface of the mechanical component. It is presently recognized that certain fluids released downhole (e.g., $CO_2$ or $H_2S$), acids, and/or bases in combination with water may result in corrosion of materials, and as such, materials reactive with at least water or the combination of water and other fluids may be useful for monitoring potential corrosion to fluid handling components, such as mineral extraction, hydrocarbon extraction, or sequestration mechanical components. The corrosion detection coating facilitates detection of exposure of certain fluids to the mechanical component via changes to properties of the corrosion detection coating (e.g., electrical properties, optical properties, or both), thereby enabling more rapid detection of potential damage to the mechanical component. For example, as discussed in more detail herein, the corrosion detection coating may be capable of producing a change in optical properties, such as a change in color, hue, and/or tone upon exposure to water, other fluids (e.g., $H_2S$, $CO_2$, or both), and/or an acid or base, or any combination thereof, over time due to a reaction between the water and/or other fluids and the corrosion detection coating that causes a change in the oxidation state of the tracers of the corrosion detection coating. Further, it is presently recognized that the disclosed corrosion detection coating may facilitate detection of a likelihood that corrosion might occur if a mechanical component is utilized based on the change in the electronic property, the optical property, or both. That is, the disclosed corrosion detection coating may be utilized to detect a presence of water before the environmental conditions reach a magnitude for corrosion to develop. Accordingly, the corrosion detection coating may help to predict future occurrences of corrosion, wherein the corrosion detection coating may be used to provide a risk assessment and a numerical value indicating a likelihood of future occurrences of corrosion. For example, the numerical value may be any percentage value between 0 and 100 percent, a numerical value between 1 to 10, 1 to 100, or 1 to 1000, or some other numerical range.

In some embodiments, the change in optical properties may include producing luminescence, among other visual indicators. At least in some instances, the changes in optical properties may occur in the visible spectrum. In some embodiments, the corrosion detection coating may be capable of responding (e.g., changing properties in response to certain fluids) while in relatively low temperatures (e.g., approximately up to 25° C.) and relatively low concentrations of water (e.g., less than approximately 600 ppm $H_2O$), such as for corrosion detection coatings positioned at a surface and a top side of completions. In some embodiments, the corrosion detection coating may be capable of responding (e.g., changing properties in response to certain fluids) while in relatively high temperatures and relatively high concentrations of water (e.g., between approximately 25 to 100° C. in Sc $CO_2$ with greater than approximately 600 ppm $H_2O$), such as for corrosion detection coatings positioned downhole and in proximity to downhole safety valves. In some embodiments, the corrosion detection coating may be capable of responding (e.g., changing properties in response to certain fluids) while in relatively high temperatures (e.g., between approximately 25 to 175° C.), such as for corrosion detection coatings positioned at locations having (or expecting) water condensates at pH less than approximately 4.0. It should be noted that the discussion herein related to hydrocarbon extraction components is meant to be non-limiting with respect to materials being extracted. For example, the disclosed techniques may be applied to fluid extraction components, such as $CO_2$ extraction components, hydrogen gas extraction components, water extraction components, or any combination thereof, as well as systems that may utilize these components (e.g., $CO_2$ extraction systems, hydrogen gas extraction systems, water extraction systems). In any case, the change in the optical property and/or electrical property may be detected or measured and utilized to modify operations associated with the mechanical component, such as causing the mechanical component to stop operating, be replaced, repaired, and/or indicate an estimated duration for which the mechanical component may continue to be utilized before it should be replaced.

With the foregoing in mind, FIG. 1 illustrates a well closure system 10 that may utilize the disclosed corrosion detection coating. In a well closure system, one or multiple closure devices 12 may be lowered into a wellbore 14 (e.g., installed and anchored within the wellbore 14) prior to certain operations, such as well production. The closure device 12 may be lowered into the wellbore 14 as a first installation, to replace a previously installed closure device 12, or to add an additional closure device 12. In any case, the closure device 12 is configured to control flow from the reservoir such that it only goes in at the specific manage points (e.g., perforations, valves, and the like). For example, the closure device 12 may block a flow of formation fluid from reaching a surface located above a geological formation 16 (e.g., via conduits such as a casing conduit 18 and/or a production tubing 20), which flow may result from high pressure conditions that arise during well production. The closure device 12 may include a valve 22, such as a subsurface valve. For example, the valve 22 may include a gate valve, a ball valve, a check valve, or any combination thereof. As shown in this configuration of the wellbore 14, the wellbore completion includes a casing conduit 18 and a production casing conduit 20 (e.g., production tubing) with an annular sealing element 24 (e.g., metal and/or elastomeric seal) that seals an annular space 26 defined between the casing conduit 18 and the production casing conduit 20. The wellbore 14 may include a wellhead 28 at the surface of the well closure system 10 that may selectively seal the casing conduit 18 and/or the production casing conduit 20.

In the illustrated example of FIG. 1, the closure device 12 includes a valve housing 30 having a valve 22, an actuation subsystem 32 (e.g., an actuator), and a valve controller 34. The closure device 12 is sealed in the production tubing by a sealing element so that the fluid may not reach the surface if it does not pass through the valve 22. The valve 22 includes a flapper that can switch between an open position to enable fluid flow and a closed position to block the fluid flow. The actuation subsystem 32 includes a biasing component 36 (e.g., a pressurization piston coupled to a spring) to maintain the valve 22 in a default position (e.g., open or closed). The valve controller 34 is configured to control and/or adjust a position of components of the closure device 12 (e.g., the valve 22) via the actuation subsystem 32 to block the flow of formation fluid from reaching the surface or to enable the fluid to flow toward the surface. In certain embodiments, the valve 22 and/or one or more additional valves may be used to control fluid flow from the surface to a downhole location, such as by injecting one or more fluids (e.g., $CO_2$).

It should be noted that the actuation subsystem 32 and the valve housing 30 may be configured to operate with or without use of hydraulic or electrical control lines extending from the surface into the wellbore 14. For example, electrical power and/or hydraulic pressure may be provided from the surface using one or more electrical generators, a power grid, batteries, hydraulic pumps, or a combination thereof. Additionally, or alternatively, the actuation subsystem 32 may be powered by one or more local power supplies, such as a battery pack, at the location of the valve 22.

The illustrated embodiment of the closure device 12 includes the valve controller 34 that may be utilized to adjust the positon of the components in the valve housing 30. The valve controller 34 controls and/or adjusts a position of the valve 22 between open and closed positions (e.g., via the actuation subsystem 32). For example, the valve controller 34 may control and/or adjust the valve 22 based on messages that are transmitted by a transmitter of a transmitter subsystem 38.

In some embodiments, the transmitter subsystem 38 may receive sensor measurements (e.g., temperature sensor measurements, pressure sensor measurements, flow-rate sensor measurements, another suitable parameter, or any combination thereof). The sensor measurements may be directed by surface sensors, downhole sensors, or completion sensors to the transmitter subsystem 38 via any suitable telemetry (e.g., via electrical signals pulsed through the geological formation 16 or via mud pulse telemetry). In some embodiments, the transmitter subsystem 38 may receive inputs from a user interface controlled by an operator. The transmitter subsystem 38 may process the sensor measurements and/or user inputs to determine a condition within the wellbore 14 or at the surface and determine whether to adjust the position of the valve 22 based on the condition of the wellbore 14 and/or the surface.

To this end, the transmitter subsystem 38 may be any electronic data processing system that can be used to carry out the systems and methods of this disclosure. For example, the transmitter subsystem 38 may include a processor 40 which may execute instructions stored in memory 42 and/or storage 44. As such, the memory 42 and/or the storage 44 of the transmitter subsystem 38 may be any suitable article of manufacture that can store the instructions. In some embodiments, the memory 42 is a tangible, non-transitory, machine-readable-medium that may store machine-readable instructions for the processor 40 to execute. The memory 42 may include ROM, flash memory, a hard drive, or any other suitable optical, magnetic, or solid-state storage medium, or a combination thereof. The memory 42 may store data, instructions, and any other suitable data. Additionally, the transmitter subsystem 38 may include an input/output (I/O) port 46, which may include interfaces coupled to various components such as input devices (e.g., keyboard, mouse), input/output (I/O) modules, sensors (e.g., surface sensors and/or downhole sensors), and the like. For example, the I/O port 46 may include a display (e.g., an electronic display) that may provide a visualization, a well log, or other operating parameters of the geological formation 16, the wellbore 14, or the surface to an operator, for example. In this embodiment, the transmitter subsystem 38 (e.g., data processing system) has been represented at the well site. However, all or part of the transmitter subsystem 38 (e.g., all or part of the processor, the display, the memory, etc.) may be situated remotely from the well site and configured to communicate with the well site via a network connection. It should be noted that, at least in some instances, all or part of the data processing system may be cloud-based.

Figure 2:
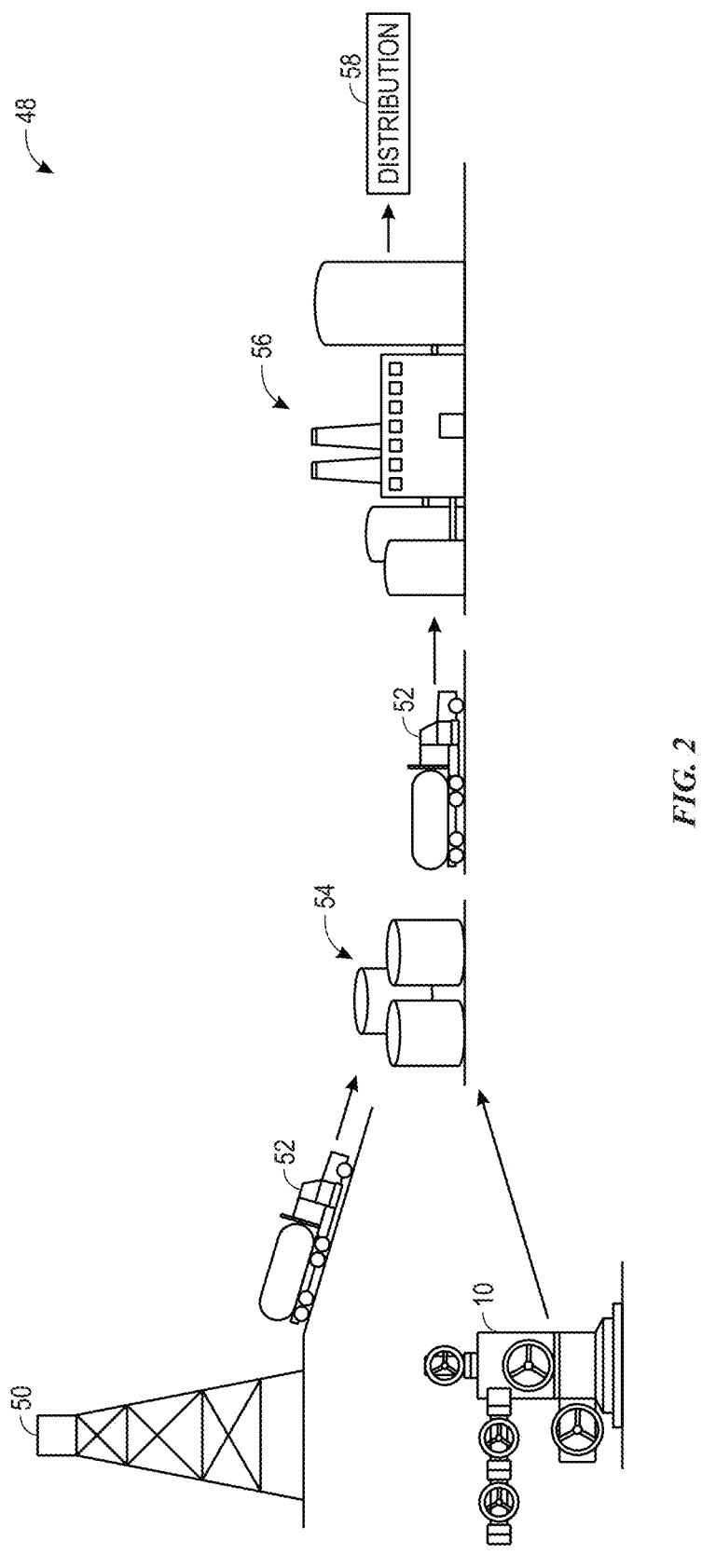
FIG. 2 is a schematic diagram of midstream operations where a corrosion detection coating may be employed, in accordance with the present disclosure.

While the description above generally relates to a well closure system, it should be noted that the corrosion detection coating may also be used for detecting corrosion in components used for other oil and gas operations, such as midstream operations. FIG. 2 is a flow diagram 48 of a midstream operation whereby crude oil, natural gas, and natural liquids (e.g., ethane, propane, and butane) may be transported (e.g., via vehicles 52 carrying storage tanks) from a well site 50 (e.g., which may include a geological closure system 10 as described in FIG. 1 or other well site components such as downhole tools, drills, and the like) to one or more storage tanks 54 or transported to a refinery 56 before ultimately being transported for distribution 58.

Figure 3:
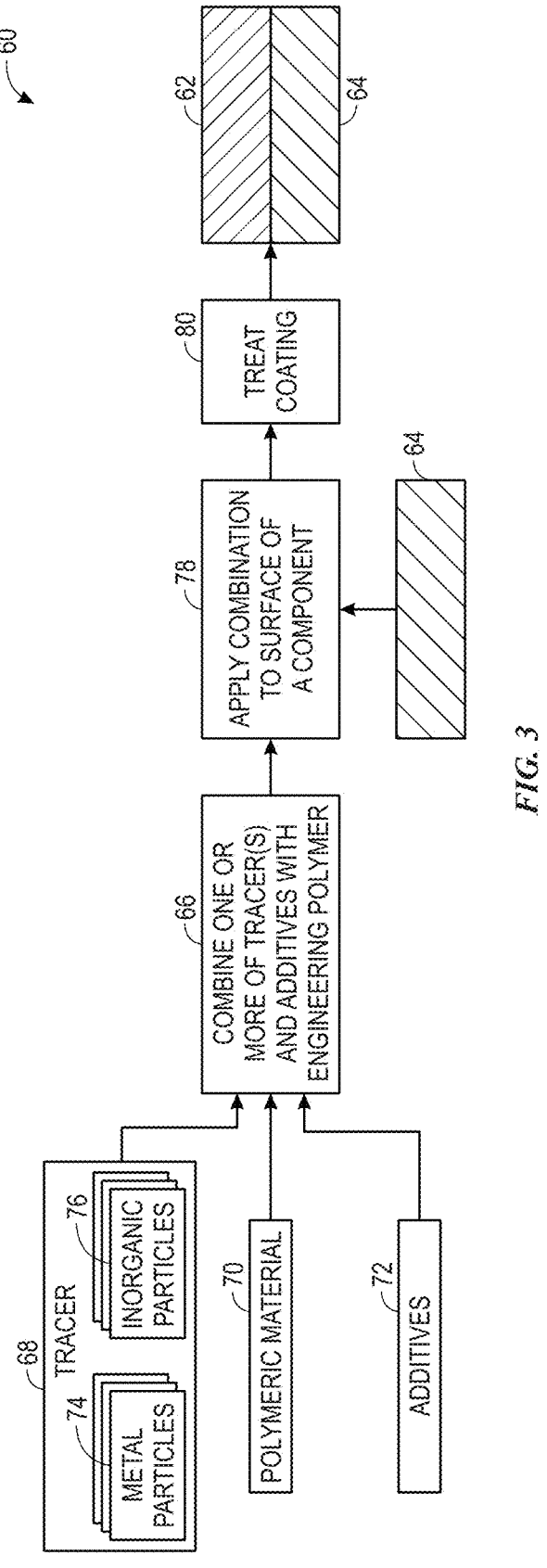
FIG. 3 is a flow diagram of an embodiment of a process for generating a corrosion detection coating, in accordance with the present disclosure.

As discussed herein, a corrosion detection coating may be applied to one or more surfaces of components to facilitate detection of corrosion due to a presence of certain fluids, such as water in a normally dry fluid like carbon dioxide or hydrogen, or water in combination with $CO_2$ or $H_2S$, an acid or base, or any combination thereof. To facilitate the discussion of the corrosion detection coating, FIG. 3 is a flow diagram of an embodiment of a process 60 for producing the corrosion detection coating 62 (e.g., material coating) on a substrate 64 (e.g., surfaces of the valve 22, the casing conduit 18, and other components described with respect to FIG. 1, or surfaces of the vehicles 52, the storage tanks 54, or other components described with respect to FIG. 2) that facilitates detection of leaks or corrosion that may be otherwise undetectable until the machine component is damaged. It should be noted that the corrosion detection coating 62 may be applied to the inside and/or outside of the substrates 64, which may facilitate detection in different applications. For example, providing the corrosion detection coating 62 on the outside of the substrate 64 may facilitate detection of water exposure to the substrate 64 (e.g., a machine component such as a valve) during transportation. Additionally, providing the corrosion detection coating 62 on the inside of the substrate 64 (e.g., a machine component such as a valve) may facilitate detection of water exposure while the machine component is in operation. The steps illustrated in the process 60 are meant to facilitate discussion and are not intended to limit the scope of this disclosure, because additional steps may be performed, certain steps may be omitted, and the illustrated steps may be performed in an alternative order or in parallel, where appropriate.

To start the process 60, at block 66, one or more tracers 68, polymeric materials 70 (e.g., monomer units of one or more polymers, such as engineering polymers), and additives 72 may be combined, mixed, dispersed, or otherwise integrated to form a mixture. In some embodiments, the mixture may be dissolved in a solvent such that the mixture may be applied to the substrate 64 (e.g., steel, tungsten alloys, or other relatively hard materials used in downhole components) using a spray process.

As discussed in more details herein, the tracers 68 are materials capable of producing a detectable, measurable, or observable change in at least a portion of the surface or volume in optical properties and/or electrical properties of the corrosion detection coating 62 upon exposure to one or more fluids, such as water, $CO_2$, $H_2S$, an acid, or a base. The tracers 68 may include one or more types of metal particles 74 and/or one or more types of inorganic particles 76, each of which may be a micron-sized particle, a nanoparticle, or a larger size particle.

At block 78, the combination of materials (or material composition) formed at block 66 (e.g., including the tracer(s) 68, the polymeric material 70, and the additives 72) may be applied, deposited, or coupled to a surface of a substrate 64. For example, in an embodiment where the combination is dissolved in a solvent, the dissolved combination may be applied to the surface of the substrate 64 using a spray deposition applicator. The amount of the combination applied to the substrate 64 may produce a suitable thickness for the operation, for example, the amount of the combination may result in a micrometer sized thickness, such as approximately 25 μm, 50 μm, 100 μm, 200 μm, 400 μm, 500 μm, or greater than 500 μm. In some embodiments, the combination may include at 40% by volume, 50% by volume, 60% by volume, 70% by volume, 80% by volume, 90% by volume, or greater than 90% by volume of the engineering polymer and 60% by volume, 50% by volume, 40% by volume, 30% by volume, 20% by volume, 10% by volume, or less than 10% of a combination of both the one or more inorganic particles and the one or more metal particles. In some embodiments, the proportion of the one or more inorganic particles and the one or more metal particles may include more inorganic particles than metal particles (e.g., greater than 80% volume of inorganic particles and less than 20% volume of metal particles, greater than 60% volume of inorganic particles and less than 40% volume of metal particles, greater than 50% volume of inorganic particles and less than 50% volume of metal particles). In some embodiments, the proportion of the one or more inorganic particles and the one or more metal particles may include more metal particles than inorganic particles (e.g., greater than 80% volume of metal particles and less than 20% volume of inorganic particles, greater than 60% volume of metal particles and less than 60% volume of inorganic particles, greater than 50% volume of metal particles and less than 50% volume of inorganic particles). At block 80, the coating may be treated to form the corrosion detection coating 62. In general, treating the coating may include suitable processes for polymerizing the engineering polymer and/or dissolving any solvent used in the coating. For example, at least in some embodiments, the coating may be treated with light (e.g., ultraviolet (UV)) and/or thermally treated for a predetermined time period. The time period may be 1 hour, 5 hours, 10 hours, 20 hours, or greater than 20 hours. The corrosion detection coating 62 is generally a material coating composed of one or more tracers 68 and additives 72 dispersed within polymeric material 70 that have been cured or treated (e.g., a cured polymeric material).

The tracers 68 may include nanoparticles having an average diameter greater than 25 nm, greater than 50 nm, greater than 100 nm, greater than 200 nm, or greater than 250 nm. The tracers 68 may include micron-sized particles having an average diameter of greater than 1 μm, greater than 2 μm, greater than 10 μm, greater than 50 μm, greater than 75 μm, or greater than 80 μm. In some embodiments, the tracers 68 may include both micron-sized and nanoparticles, and as such, the tracers 68 may have a range of particle sizes between 10 nm and 200 μm, 25 nm and 100 μm, 50 nm and 75 μm, or 100 nm and 50 μm.

In some embodiments, the corrosion detection coating 62 may include metal particles 74 and/or inorganic particles 76. For example, the corrosion detection coating 62 may include a combination or mixture of one or more metal particles 74 and one or more inorganic particles 76. In any case, the metal particles 74 and/or inorganic particles 76 are generally capable of producing the detectable change in the optical property and/or electrical property based on a reaction between one or more fluids (e.g., water, water and $H_2S$, water and $CO_2$, water and an acid, water and a base) and the particles (e.g., the metal particles and/or inorganic particles) of the material coating. In some embodiments, the tracers 68 may be insoluble in water, acidic water, or basic water. In some embodiments, the tracers 68 may be soluble in water such that the tracers 68 may dissolve and cause a darkening in the corrosion detection coating 62 due to change (e.g., increase or decrease) in opacity resulting from the tracer 68 dissolving. Alternatively, the tracers 68 may cause a lightening in the corrosion detection coating 62 due to the corrosion detection coating 62 becoming less opaque after reacting with fluids.

The metal particles 74 may include metals or metal alloys. For example, the metal particles 74 may include transition metals, such as one or more of copper, zinc, nickel, iron, cobalt, cadmium, manganese, titanium, vanadium, zirconium, chromium, or any combination thereof. In some embodiments, the metal particles 74 may include main group metals, such as one or more of aluminum, tin, bismuth, boron, silicon, or any combination thereof. In some embodiments, the metal particles 74 may include alloys of transition metals, main group metals, or any combination thereof. For example, the metal particles 74 may include copper alloys, such as one or more of Cu—Ni, Cu—Zn, Cu—Sn, or Cu—Ag. As another non-limiting example of alloys, the metal particles 74 may include zinc alloys, such as one or more of Zn—Cu, Zn—Al, Zn—Co, or Zn—Al—Mg. It should be noted that particles of zinc alloys may be more durable (e.g., having a relatively greater mechanical hardness) as compared to copper particles. As another non-limiting example of alloys, the metal particles 74 may include bismuth alloys, such as one or more of Bi—Sn, Bi—Sn—Zn, or Bi—In. It should be noted that these metals may be less reactive that certain transition metal alloys, but may nonetheless still discolor in the presence of $H_2S$ and water. Example compositions of certain metals and metal alloys are presented in Table 1.

TABLE 1

| Examples of metals and metal alloys that may be employed as metal particles. | |
| --- | --- |
| Name & Family | Typical composition |
| Cu powder | 99 wt. % Cu |
| Cu—Ni (cupronickel) | Reacts with $H_2S$; up to 35 wt. % Ni is common along alloys |
| Cu—Zn (brass) | 60 wt. % Cu-40 wt. % Zn |
| Cu—Sn (Phosphorus Bronze) | 7 wt. % Sn-0.35 max P |
| Cu—Ni | Cu-16.5-19.5 Ni |
| Cu—Ag | Relatively high cost and may include <1 wt. % Ag |
| Zn | Reacts with sulfur to produce ZnS that luminesce |
| Zn—Cu, Zn—Al, Zn—Al—Mg, Zn—Co | More durable than just Cu |
| Bi, Bi—Sn, Bi—Sn—Zn, Bi—In | Highly inert, but may discolor in the presence of $H_2S$ |

The inorganic particles 76 may include metal oxides, sulfides, phosphides, phosphates, and/or carbonates. For example, the metal oxides may include transition metal oxides, such as one or more of nickel oxide, chromium oxide, titanium oxide, copper (i) oxide, red iron oxide, black iron oxide yellow oxide, nickel oxide, molybdenum trioxide, cadmium oxide, or any combination thereof. The metal oxides may include main group metal oxides, such as one or more of magnesium oxide, aluminum oxide, tin oxide, calcium oxide, or any combination thereof. The metal sulfides may include transition metal sulfides, such as one or more of green zinc sulfide, white zinc sulfide, copper sulfide, iron sulfide, cadmium sulfide, or any combination thereof. The metal sulfides may include main group oxides such as tin disulfide. The metal phosphides may include transition metal phosphides, metal phosphides, or a combination thereof, such as iron phosphide or gallium phosphide. The metal carbonates may include transition metal carbonates, such as one or more of cobalt carbonate, nickel carbonate, coper carbonate, or any combination thereof. The metal carbonates may include main group carbonates, such as calcium carbonate, lithium carbonate, and the like. Example compositions of certain inorganic particles are presented in Table 2.

TABLE 2

| Examples of oxides, sulfides, phosphides, and carbonates that may be employed as inorganic particles. | | | |
| --- | --- | --- | --- |
| Color | Name & Family | Thermal stability | Water solubility |
| Green | Nickel oxide, NiO | Tm ~1955° C. | Negligible |
| | Chrome oxide, $Cr_2O_3$ | Tm ~2435° C. | Insoluble |
| | Nickel carbonate, $NiCO_3$ | Decomposition: ~205° C. | Negligible |
| | Copper carbonate, $CuCO_3$ | Tm ~200° C. | Soluble |
| | Zinc sulfide, ZnS (pure) | Tm ~1850° C. | Negligibly soluble |
| White | Titanium oxide, $TiO_2$ | Tm ~1843° C. | Insoluble |
| | Magnesium oxide, MgO | Tm ~2852° C. | Soluble in acids |
| | Aluminum oxide, $Al_2O_3$ | Tm ~2072° C. | Insoluble |
| | Tin oxide, $SnO_2$ | Tm ~1630° C. | Insoluble |
| | Calcium carbonate, $CaCO_3$ | Tm ~1339° C. | Negligible soluble |
| | Calcium oxide, CaO | Tm ~2572° C. | Soluble |
| | Lithium carbonate, $Li2CO3$ | Tm ~723° C., decomposes at ~1300° C. | Highly soluble in water |
| | Zinc oxide, ZnO (pure) | Tm ~1974° C. (decomposes) | |
| | Zinc sulfide, ZnS | Tm ~1850° C. | Negligible |
| Red | Copper oxide, $Cu_2O$ | Tm ~1232° C | Insoluble |
| | Iron oxide, red | Tm ~1539° C. | Insoluble |
| Purple | Cobalt carbonate, $CoCO_2$ | Tm ~427° C., decomposes to $Co_2O$ at ~140° C. | Insoluble |
| Blue | $Na_6Al_6Si_6O_{24}S_4$ | Color Stable up to ~300° F. | |
| | $CaCO_3 + C_2N_8H_{16}Cu$ | Color Stable up to ~330° F. | |
| | $Si_4O_{10}(OH)_2Mg_3$—$Co_3Ca$—Al | Color Stable up to ~330° F. | |
| | $C_6Fe_2KN_6 + TiO_2$ | Color Stable up to ~300° F. | |
| | $CuAl_6(PO_4)_4(OH)_8•4H_2O$ | Tm >700° C. | Soluble |
| Black | Cobalt oxide | Tm ~1933° C. | Insoluble |
| | Nickel oxide, $Ni_2O_3$ | Decomposes at ~600° C. | Negligible soluble |
| | Iron oxide, black | Tm ~1539° C. | |
| | Copper sulfide, CuS | Tm >500° C. | Insoluble |
| | Iron sulfide, FeS | Tm ~1194° C. | Negligible |
| Yellow | Cadmium oxide | Tm >900° C. | Slightly soluble |
| | Cadmium sulfide, CdS | Tm ~1750° C. | Insoluble |
| | Tin disulfide, $SnS_2$ | Tm ~600° C. | Insoluble |
| | Iron oxide, yellow | Tm ~1539° C. | |

In some embodiments, the inorganic particle 76 or metal particle 74 may be selected to have a particular color or result in particular color or optical property upon exposure to fluids and/or pH. For example, oxides, carbonates, and sulfides that are generally white, yellow, and red (e.g., as indicated by Table 2) may produce a visible darkening or color change in the presence of water and/or presence of $H_2S$. For example, the inorganic particle 76 may be white in an initial oxidation state, such as tin oxide, which is water insoluble and amphoteric (e.g., dissolves in acids and bases), $SnO_2$, boric oxide (i.e., $B_2O_3$), calcium oxide (i.e., CaO), or magnesium oxide (i.e., MgO), or any combination thereof. It should be noted that $B_2O_3$ may absorb water relatively slowly to form boric acid, and produce a visible change in opacity and/or color with a small amount of $B_2O_3$. As such, a corrosion detection coating 62 including inorganic particles 76 such as tin oxide, $SnO_2$, boric oxide, calcium oxide, or magnesium oxide may be capable of producing a detectable change in optical properties due to a reaction between the inorganic particles and acidic fluids. As another non-limiting example of a white inorganic particle 76, zinc oxide may display a color change in the presence of $H_2S$ or a yellow reversible change when heated in air. As such, a corrosion detection coating 62 including zinc oxide may be capable of producing a detectable change in optical properties (e.g., based on a magnitude of the change in color from white) due to a reaction between ZnO and $H_2S$.

With respect to examples of yellow inorganic particles 76, it is noted that bismuth oxide (i.e., $Bi_2O_3$) may produce different colors resulting between reactions with $CO_2$ and/or temperature. As such, a corrosion detection coating 62 including bismuth oxide may be capable of producing a detectable change in optical properties due to a reaction between bismuth oxide and $CO_2$. With respect to examples of red inorganic particles 76, it is noted that iron oxide and copper oxide may produce different colors resulting between reactions with water of different pH and/or $H_2S$. As such, a corrosion detection coating 62 including iron oxide and/or copper oxide may be capable of producing a detectable change in optical properties due to a reaction between iron oxide and/or copper oxide and water of different pH and/or $H_2S$. In any case, the magnitude of the change in the optical properties from white or yellow to a different color may be used to determine an amount of exposure of a substrate 64 of a mechanical component to certain fluids, thereby enabling rapid detection of components that may soon become or are already compromised.

In some embodiments, the reaction between fluids and metal particles 74 and/or inorganic particles 76 may cause the metal particles 74 and/or inorganic particles 76 to corrode, resulting in a color change. For example, certain oxides may react in alkali conditions, such as iron, which corrode to form iron hydroxide.

In some embodiments, the reaction between fluids and metal particles 74 and/or inorganic particles 76 may cause the metal particles 74 and/or inorganic particles 76 to undergo a brightening due to the presence of water. For example, the brightening of a dark pigment, such as $Ni_2O_3$, included in a corrosion detection coating 62 may indicate that a mechanical component coated with the corrosion detection coating 62 has been exposed to water due to the reaction between water and $Ni_2O_3$.

As another example, the inorganic particle 76 may gain an optical property in the presence of the fluids. For example, Zn may be used as the tracer 68, which forms ZnS in the presence of $H_2S$, and thus may luminesce. Luminesce or other optical property resulting from the change in the composition of the tracer 68 (e.g., Zn changing to ZnS) may facilitate early detection of exposure of the substrate 64 coated with the corrosion detection coating 62 to flow or corrosion.

In general, the polymeric material 70 are subunits (e.g., monomers) of a polymer having mechanical properties, such as one or more of heat resistance, mechanical strength, rigidity, chemical stability, self-lubrication, or any combination thereof, suitable for maintaining the structure of the material coating during certain oil and gas operations described herein. In some embodiments, the polymeric material 70 may include engineering polymers. For example, the polymeric material 70 may have an operating temperature up to at least 200° C., at least 250° C., at least 300° C., at least 350° C., or greater than 350° C. The polymeric material 70 may include one or more of polyether ether ketone (PEEK), polyetherketone (PEK), other polyaryletherketone (PAEK) polymers, polyphenylene sulfide, nylon polymers, epoxy polymers, or any combination thereof.

In some embodiment, the material coating may include one or more additives 72 that generally improve one or more of the hardness (e.g., hardening additives), improve the lubrication (e.g., lubricative additives), or modify (e.g., increase or decrease) the permeability (e.g., permeability control additives) of the corrosion detection coating, thereby controlling the rate at which the tracers react with fluids. In some embodiments, the additives 72 may include carbon additives graphene, nanotubes, graphite, fullerene, or any combination thereof. At least in some instances, the carbon additives may contribute to the electrical properties of the corrosion detection coating. For example, it is recognized that one or more layers of graphene may improve the conductance of the corrosion detection coating, which may facilitate the measurement of the electrical properties of the corrosion detection coating. In some embodiments, the additives 72 may include ceramic hardeners, such as alumina ($Al_2O_3$) and titanium (ii) oxide ($TiO_2$).

Figure 4:
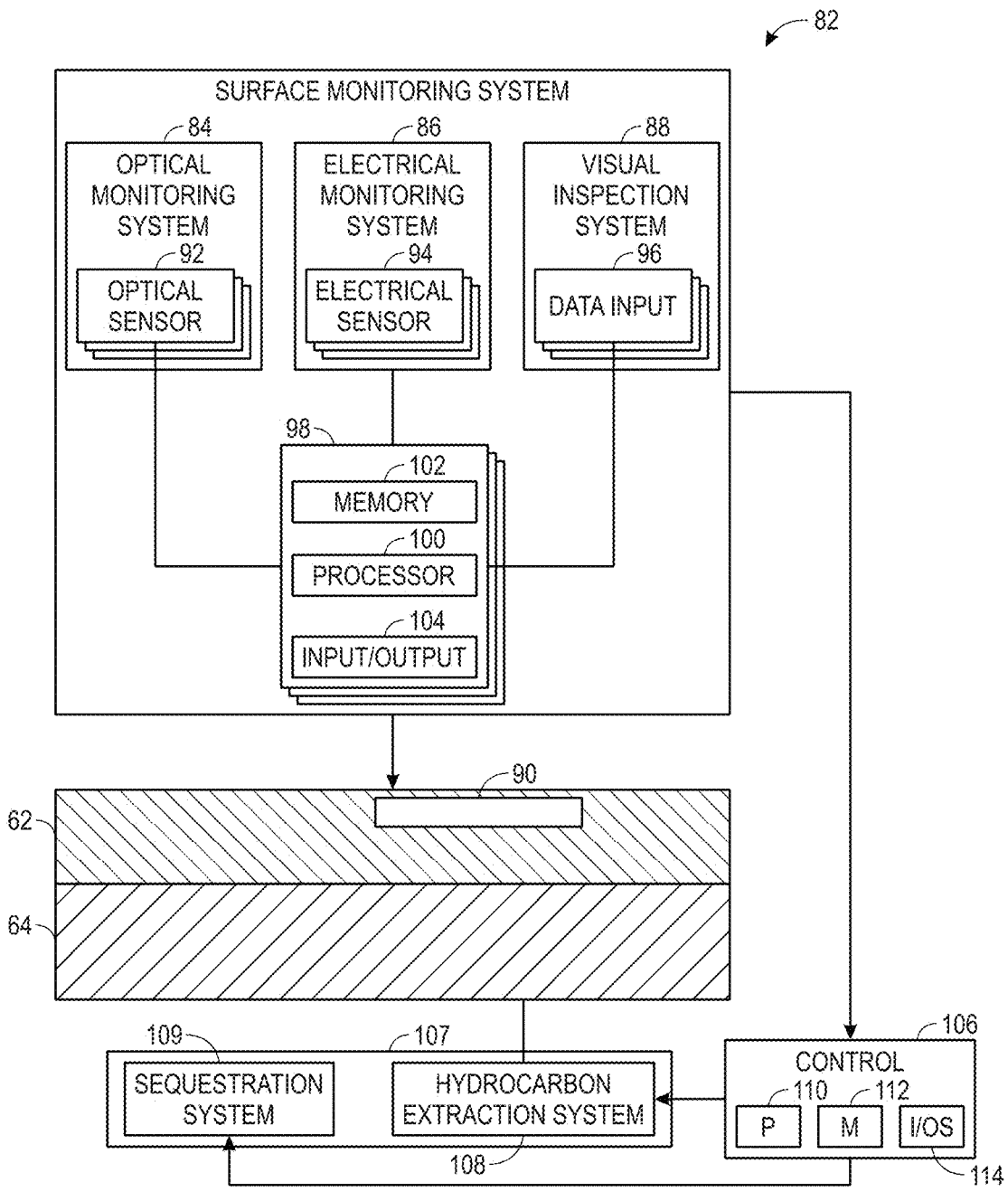
FIG. 4 is a block diagram of an embodiment of a surface monitoring system, in accordance with the present disclosure.

To illustrate how the corrosion may be detected, FIG. 4 is a diagram of an embodiment of a surface monitoring system 82 configured to detect a change in the optical and/or electrical properties of the corrosion detection coating 62. For example, the surface monitoring system 82 may include one or more of an optical monitoring system 84, an electrical monitoring system 86, and/or a visual inspection system 88.

As discussed with respect to FIG. 3, the corrosion detection coating 62 is generally a material coating composed of one or more tracers 68 dispersed within a polymeric material 70 that has been treated or cured. In general, and as discussed in more detail herein, the tracers 68 are materials capable of producing a detectable, measurable, or observable change in at least a portion 90 of the surface or volume in optical properties and/or electrical properties of the corrosion detection coating 62 upon exposure to one or more fluids, such as water, $CO_2$, $H_2S$, an acid, or a base. As referred to herein, a "change in an optical property" may include one or more of a change in a color, a hue, a reflectance, a transmission, a polarization, an absorption, or a luminescent capability of a material. As referred to herein, a "change in an electrical property" may include a change in an impedance of a material, which may be measureable by a change in an inductance, a capacitance, and a resistance. In some embodiments, the tracers include materials capable of producing the detectable change in the optical property and/or electrical property based on a combination of fluids, such as water and $CO_2$, water and $H_2S$, water and an acid, or water and a base.

The optical monitoring system 84 generally includes one or more optical sensors 92 to measure or detect the change in the optical properties of the corrosion detection coating 62 due to changes on a surface (e.g., the portion 90) of the corrosion detection coating 62. In some embodiments, the optical sensors 92 may include cameras, light detectors, and other suitable devices capable of generating an image or spectrum indicative of the composition of the corrosion detection coating 62. For example, the optical sensors 92 may include a light source to emit light at one or more frequencies and a light detector positioned to receive the light reflected or transmitted through the corrosion detection coating 62 and generate sensor data.

The electrical monitoring system 86 generally includes one or more electrical sensors 94 that measure or detect the change in the electrical properties of the corrosion detection coating 62 due to changes on a surface (e.g., the portion 90) of the corrosion detection coating 62. In some embodiments, the electrical sensors 94 may include electrical property sensors, multimeters, and other suitable devices capable of measuring a resistance of the corrosion detection coating 62, a change in current flowing through the corrosion detection coating 62, a change in the dielectric constant of the corrosion detection coating 62, and the like, that are indicative of the composition of the corrosion detection coating 62.

The visual inspection system 88 generally includes a data input device 96 where visual data may be input indicative of a change in the optical properties of the corrosion detection coating 62. For example, the change may be a binary indication (e.g., "0" for no change, "1" for a change) or may be indicative of a magnitude of change (e.g., a color of the surface (e.g., the portion 90), an area of the surface, a tint of the surface, a hue of the surface, and the like).

In any case, the sensor data (e.g., generated by the optical sensor(s) 92 and/or the electrical sensor(s) 94) and/or the visual data (e.g., from the visual inspection system 88) may be output to a computing device 98 (e.g., computer) having a processor 100, which may execute instructions stored in memory 102 and/or storage media, or based on inputs provided from a user via the input/output (I/O) device 104. The memory 102 and/or the storage media may be read-only memory (ROM), random-access memory (RAM), flash memory, an optical storage medium, or a hard disk drive, to name but a few examples. For example, in operation, the processor 100 may receive sensor data and/or the visual data, determine that the visual properties or electrical properties of the corrosion detection coating 62 have changed above a threshold indicating a potential of exposure to water and $H_2S$, $CO_2$, or any combination thereof, and send an alert or suitable control signals to take a corrective action.

In some embodiments, the processor 100 of the surface monitoring system 82 may send suitable control signals to a controller 106 (e.g., an external controller) of a fluid handling system 107. In general, the fluid handling system 107 refers may include machine components or downhole components that control one or more oil and gas operations. For example, the fluid handling system 107 may include systems for retrieving fluids oil, natural gas, water and/or injecting fluids such as water and/or $CO_2$. In embodiments where the fluid handling system 107 is expected to retrieve or inject fluids that may be detectable by certain embodiments of the corrosion detection coating 62, the materials of the corrosion detection coating 62 may be selected such that the corrosion detection coating 62 facilitates detection of unexpected fluids. For example, in an embodiment where the fluid handling system 107 is injecting $CO_2$, the corrosion detection coating 62 may be configured to detect $H_2O$ as it is recognized that $H_2O$ (e.g., an unexpected or undesirable fluid) in combination with $CO_2$ may corrosion of the machine components of the fluid handling system 107.

In the illustrated embodiment, the fluid handling system 107 includes a hydrocarbon extraction system 108 and/or a sequestration system 109, or other suitable electronic device. For example, the hydrocarbon extraction system 108 may include a wellhead, a casing head, a tubing head, a frac head, a Christmas tree having various valves and flow control equipment, a blowout preventer, tubing, a chemical injection system, or any combination thereof. For example, the hydrocarbon extraction system 108 may include the transmitter subsystem 38 and the well closure system 10 described in FIG. 1. The sequestration system 109 may include suitable components (e.g., valves, packers, pumps, wellheads, tubes, pipes, couplings, and other components along downhole tubulars and downhole jewelry) for performing sequestration operations, such as CCS as described herein. As such, the suitable control signal may cause the transmitter subsystem 38 to transmit a control signal that causes a valve 22 to modify a position (e.g., open or close), a drill to halt operation, and the like. As another non-limiting example, the mineral extraction system 108 may include vehicles 52 (e.g., that assist transporting the extracting material) transporting storage tanks 54, as discussed in FIG. 2. As such, the suitable control signal may generate an alert (e.g., via a computing device of a driver or other user) indicating that a storage tank 54 having one or more surfaces coated with the corrosion detection coating 62 may have been exposed to one or more fluids (e.g., indicating an amount of water present in a fluid that is expected to be dry and a leak), and thus, may need to be replaced or receive maintenance.

Figure 11:
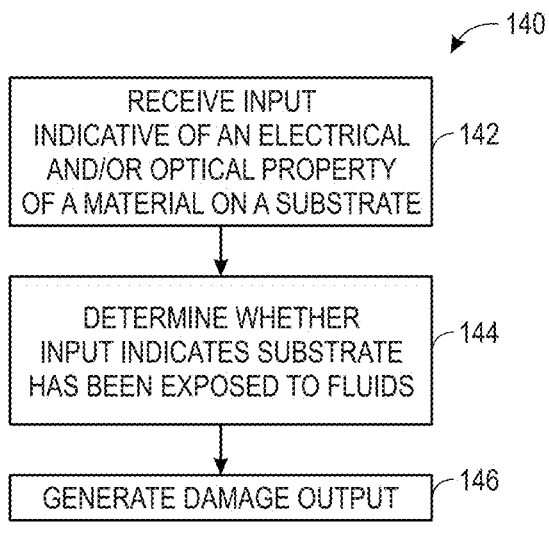
FIG. 11 is a flow diagram of a process for generating a machine component damage output based on a change in electrical properties, optical properties, or both, of a corrosion detection coating, in accordance with the present disclosure.

In this way, by enabling the surface monitoring system 82 to monitor and control operation of a fluid handling system 107, the surface monitoring system 82 may be utilized in maintenance or machine health monitoring operations. That is, the surface monitoring system 82 may be capable of receiving data (e.g., the sensor data, the visual data, or both), making a determination about a state or condition of the corrosion detection coating 62 (e.g., whether the corrosion detection coating 62 has been exposed to an amount of water and other fluids above a threshold), and outputting control signals or alert that may modify the operation of the fluid handling system 107, such as halting operations, alerting a user that a component including the corrosion detection coating 62 needs to be replaced, and the like. Additional details with regards to monitoring and controlling operation of equipment (e.g., the mineral extraction system 108) are discussed in more detail with respect to FIG. 11.

The controller 106 associated with the fluid handling system 107 includes a processor 110, which may execute instructions stored in memory 112 and/or storage media 44, or based on inputs provided from a user via the input/output (I/O) device 114. The processor 110 may execute instructions stored in memory 112 and/or storage media, or based on inputs provided from a user via the input/output (I/O) device 114. The memory 112 and/or the storage media 44 may be read-only memory (ROM), random-access memory (RAM), flash memory, an optical storage medium, or a hard disk drive, to name but a few examples. At least in some instances, the processor 100 of the computing device 98 of the surface monitoring system 82 may send the control signals directly to the fluid handling system 107 instead of sending control signals to an external processor (e.g., the processor 110 of the controller 106).

Figure 5:
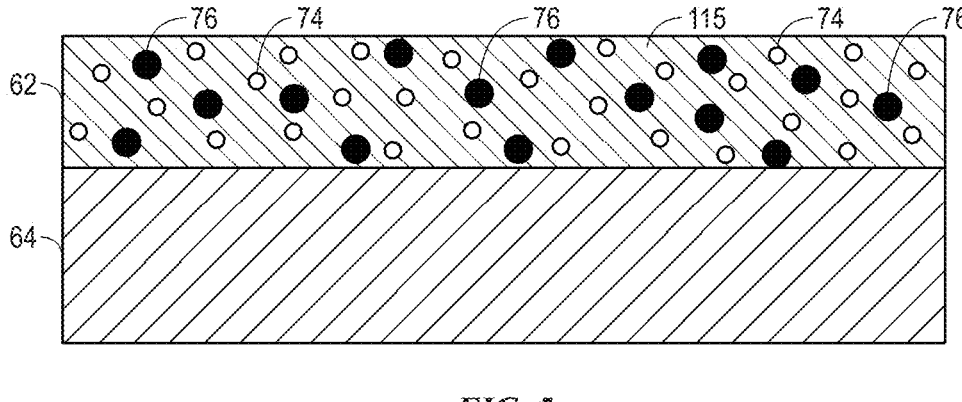
FIGS. 5-8 are cross-sectional views of embodiments of a corrosion detection coating on a machine component, in accordance with the present disclosure.

To illustrate one embodiment of the corrosion detection coating 62, FIG. 5 shows a cross section of an embodiment of the corrosion detection coating 62 having multiple materials dispersed within the cured polymeric material 115. In the illustrated embodiment, metal particles 74 and inorganic particles 76 are dispersed within the cured polymeric material 115. It should be noted that the combination of materials (e.g., the metal particles 74 and inorganic particles 76) shown in FIG. 5 is non-limiting. That is, in some embodiments, one or more types of metal particles 74, one or more types of inorganic particles 76, and/or one or more types of additives may be dispersed within the cured polymeric material 115.

In some embodiments, one or more of the steps of the process 60 may be repeated. For example, steps 66, 78, and 80 may be repeated to form multiple layers (e.g., two, three, four, or more) of the corrosion detection coating 62. In some embodiments, the tracers 68, the polymeric material 70 (e.g., used to produce a cured polymeric material 115), and/or the additives 72 may differ such that the composition of a second layer is different than a first layer (e.g., applied in a previous step). At least in some instances, one or more materials may be deposited in between the layers of the corrosion detection coating 62, such as conductive metal films. Such embodiments where one or more steps of the process 60 may be repeated or steps may be added are discussed with respect to FIGS. 6-8. In some embodiments, multiple corrosion detection coatings 62 may be used to sense in stages, a presence and/or concentration of fluids. For example, the multiple corrosion detection coatings 62 may vary based on an expected temperature range associated with a region where the component is being utilized. That is, components below a valve (e.g., further from the surface) may have a first expected temperature range and components above the value (e.g., closer to the surface) may have a second expected temperature range. Accordingly, the materials (e.g., the metal particles 74, the inorganic particles 76, the additives 72, and the polymeric material 70) may be selected such that the material may be unreactive in the respective temperature ranges and reactive when the respective expected temperature ranges are in an unexpected temperature range, pH, pressure, or any combination thereof.

Figure 6:
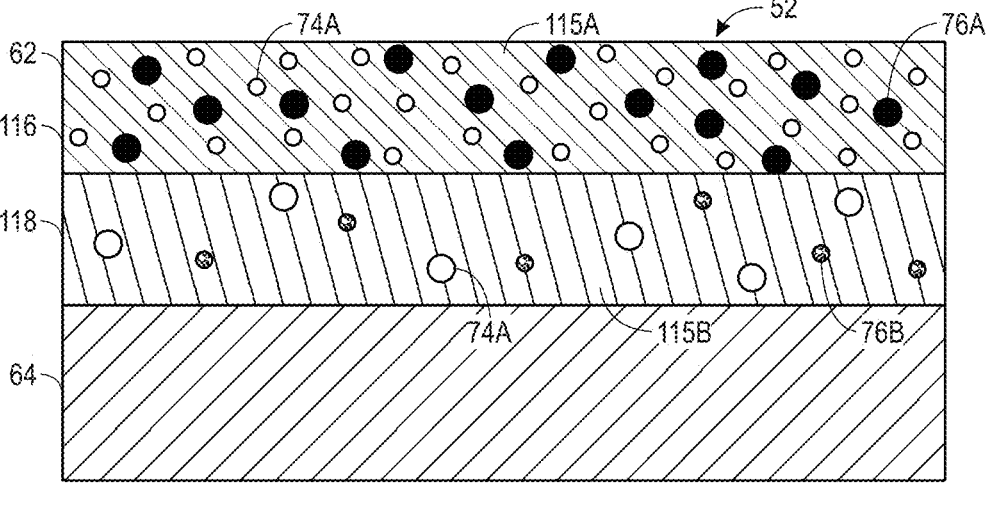

To illustrate another embodiment of the corrosion detection coating 62, FIG. 6 shows a cross section of an embodiment of a corrosion detection coating 62 having multiple layers (e.g., a first layer 116 and a second layer 118). In the illustrated embodiment, the first layer 116 includes metal particles 74a and inorganic particles 76a are dispersed within the cured polymeric material 115a. The second layer 118 includes metal particles 74b and inorganic particles 76b are dispersed within the cured polymeric material 115b. It should be noted that the combination of materials (e.g., the metal particles 74a, 74b and inorganic particles 76a, 76b) shown in FIG. 6 is non-limiting. That is, in some embodiments, multiple types of metal particles 74, multiple types of inorganic particles 76, or additives may be dispersed within the cured polymeric material 115.

Figure 7:
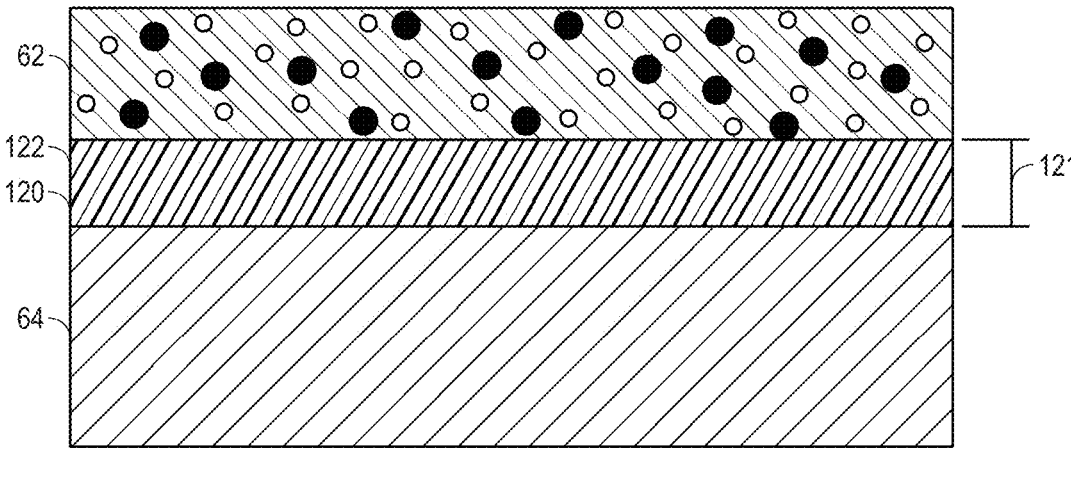

In some embodiments, a substrate underlayer 120 may be applied to a surface 122 of the substrate 64 prior to applying the corrosion detection coating 62, as shown in FIG. 7. The substrate underlayer 120 may improve binding of the corrosion detection layer 62 to the substrate 64 and/or provide protection to the surface 122 of the substrate 64 due to mechanical wear (e.g., the substrate underlayer 120 may have a relatively higher mechanical hardness than the substrate 64). The substrate layer 120 may include one or more multiple layers of a carbide, a nitride, a boride, which may be applied by techniques such as thermal spray or thermal diffusion. The thickness 121 of the substrate layer 120 may be relatively thin (e.g., approximately 100 mm, approximately 90 mm, approximately 80 mm, approximately 75 mm, less than 75 mm). In some embodiments, the substrate under layer 120 may be a metallic plating, such as Ni (Ni—P, Ni—W, Ni—Co—P), Co (Co—P). The thickness 121 of the substrate layer 120 may be less than approximately 100 $\mu$m, less than approximately 90 $\mu$m, less than approximately 80 $\mu$m, less than approximately 75 $\mu$m, less than approximately 50 $\mu$m. It should be noted that providing the substrate underlayer 120 may improve the mechanical wear resistance of mechanical components, such as tools, while the corrosion detection coating 62 may be used for maintenance monitoring operations, such as determining whether a mechanical component coated with the substrate underlayer 120 and the corrosion detection coating 62 has been exposed to fluids that may damage the mechanical component, but may otherwise be difficult to detect prior to the mechanical component being rendered inoperable due to damage.

Figure 8:
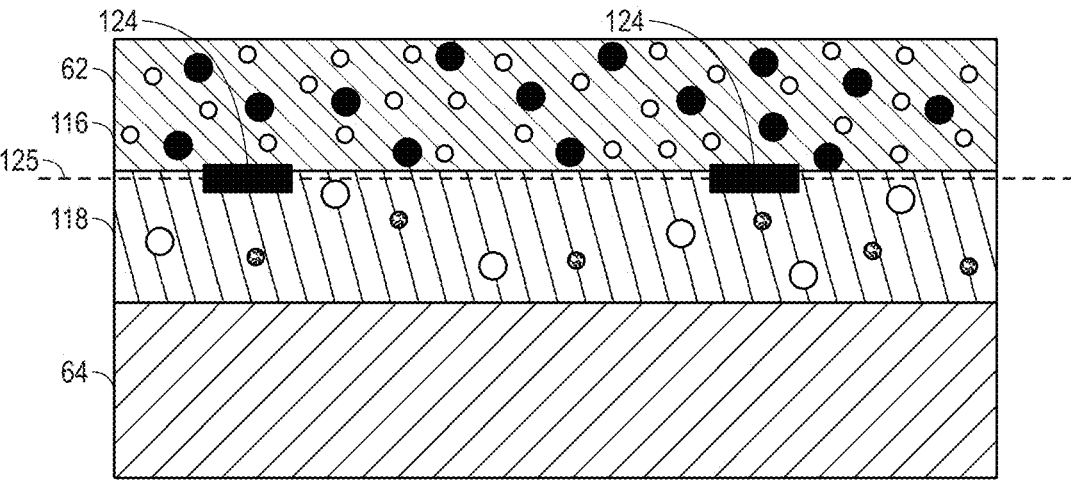

In some embodiments, multiple layers of the corrosion detection coating 62 may be applied to a substrate 64 and an intervening layer of a material other than the corrosion detection coating 62 may be applied before application of a second layer or third layer, as shown in FIG. 8. For example, a conductive layer 124 may dispersed between the first layer 116 and the second layer 118. In general, the conductive layer 124 may be a wire, conductive tape, metal particles, or other suitable materials capable of conducting current through the layers. For example, the conductive layer 124 may be graphene, copper, gold, and other conductive materials. The area coverage of the conductive layer (e.g., percent area of a cross section 125) may be less than approximately 10%, less than approximately 9%, less than approximately 8%, less than approximately 7%, less than approximately 6%, or less than approximately 5%.

Figure 9:
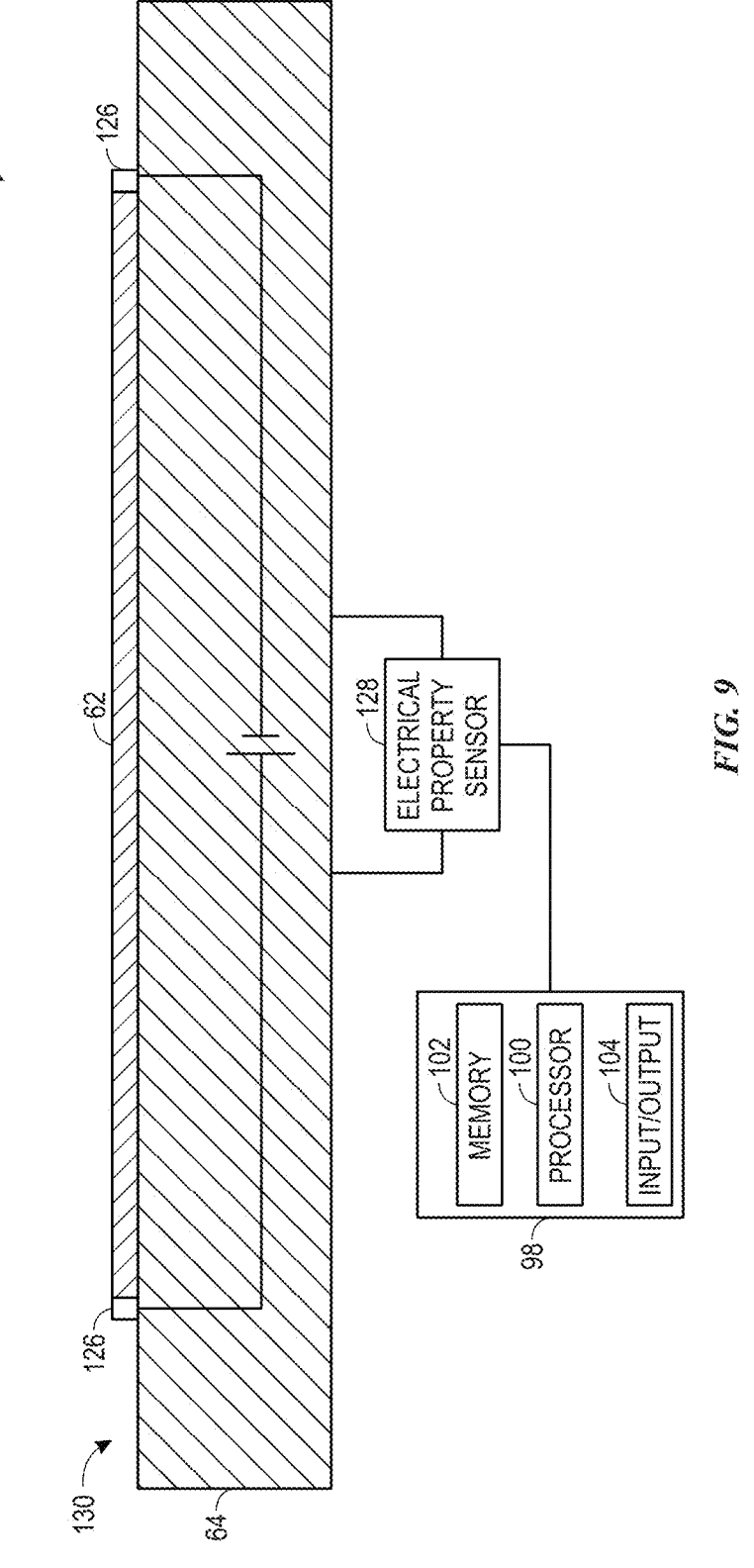
FIG. 9 is a schematic diagram of an embodiment of an electrical monitoring system used with a corrosion detection coating, in accordance with the present disclosure.

FIG. 9 is a schematic diagram of an embodiment of the electrical monitoring system 86 of the surface monitoring system 82, in accordance with the present technique. The embodiment of the electrical monitoring system 86 illustrated in FIG. 9 includes electrodes 126 electrically coupled to the corrosion detection coating 62. A current may be applied to the corrosion detection coating 62. In certain embodiments, the circuit 130 includes an electrical property sensor 128 (e.g., electrical property sensor 94), such as a multi-meter, communicatively coupled to the processor 100 of the computing device 98. The electrical property sensor 128 provides suitable signals to indicate changes in the composition of the corrosion detection coating 62 (e.g., due to a reaction between the tracers 68 and fluids that results in a change in the oxidation state of the metals or cations of the tracers 68), resulting in a change in the electrical properties of the circuit 130. Based on the change in the electrical properties of the circuit 130, the processor 100 of the computing device 98 may determine the change in the composition of the corrosion detection coating 62.

Figure 10:
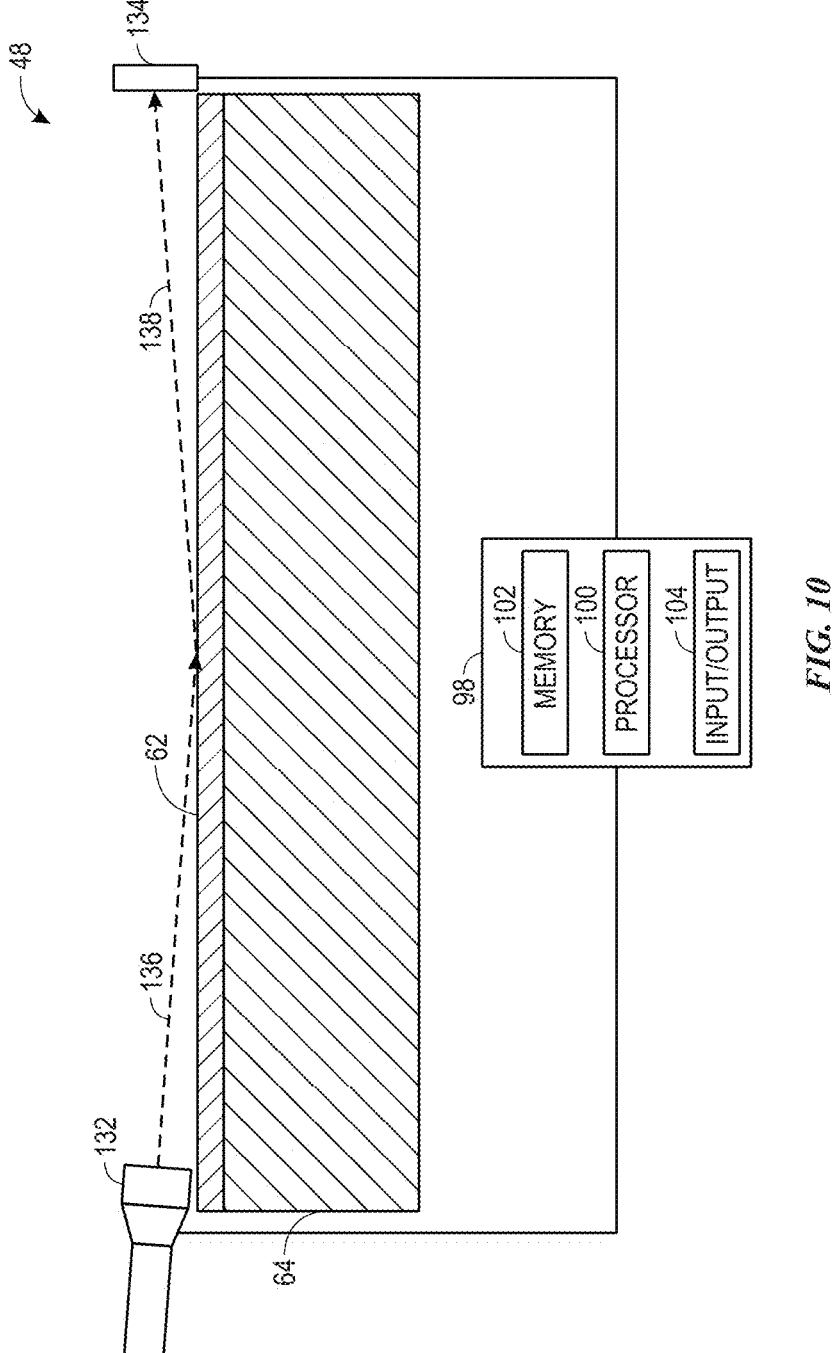
FIG. 10 is a schematic diagram of an embodiment of an optical monitoring system used with a corrosion detection coating, in accordance with the present disclosure.

FIG. 10 is a schematic diagram illustrating an embodiment of the optical monitoring system 84 of the surface monitoring system 82, in accordance with the present technique. More specifically, the optical monitoring system 84 illustrated in FIG. 10 optically detects or measures optical properties of corrosion detection coating 62. The illustrated embodiment includes a light source 132 and a light detector 134 (e.g., an optical sensor 92). The light source 132 generates emitted light 136 having an intensity that is detected by the light detector 134. During operation of the embodiment of the optical monitoring system 84 illustrated in FIG. 10, emitted light 136 from the light source 132 that interacts with the corrosion detection coating 62 may result in modified light 138. Modified light 138 may result from emitted light 136 that is scattered, absorbed, reflected, or absorbed and subsequently reemitted, for example, through fluorescence or Raman. The modified light 138 may have an intensity that differs from the intensity of the emitted light, which is proportional to a change in the composition of the corrosion detection coating 62 (e.g., material coating), such as by oxidation of metals of the metal particles. In certain embodiments, no modified light 138 is detected by the light detector 134, indicating that the change in the composition of the corrosion detection coating 62 was sufficient enough to block or prevent the emitted light 136 from reaching the light detector 134. Alternatively, if the corrosion detection coating 62 includes a material that reflects a minimal amount of light in an unreacted (e.g., unexposed) state, then no modified light 138 being detected by the light detector 134 may indicated that the corrosion detection coating 62 has not been exposed to fluids. The light detector 134 is disposed in suitable positions downstream from the light source 132 to detect a change in the emitted light 136 based on the change in the composition of the corrosion detection coating 62.

To illustrate operation of the embodiments of components of the surface monitoring system 82 described in FIGS. 4, 9 and 10, FIG. 11 illustrates an embodiment of a process for generating a corrosion detection output, such as an alert or a control signal to modify operation of components of a fluid handling system 107. Although the method 140 is described as being performed by the computing device 98, it should be noted that any suitable computer or processor-based device capable of communicating with other components of the surface monitoring system 82 may perform the disclosed method 140 including, but not limited to, the controller 106, the transmitter subsystem 38, and the like.

At block 142, the surface monitoring system 82 may acquire optical property data and/or electrical property data using the optical monitoring system 84, the electrical monitoring system 86, and/or the visual inspection system 88. For example, in an embodiment where the surface monitoring system 82 includes the electrical monitoring system 86, the surface monitoring system 82 may activate the electrodes 126 to cause the electrodes 126 of the electrical monitoring system 86 to induce a current (e.g., by applying a voltage) across the corrosion detection coating 62 and the electrical monitoring system 86 may acquire data indicative of the electrical property of the corrosion detection coating 62 based on the current provided to the one or more corrosion detection coating 62. For example, the surface monitoring system 82 may determine a magnitude of the change in the electrical property (e.g., based on a relative change). At block 144, the surface monitoring system 82 may determine whether the substrate 64 has been exposed to fluids, needs maintenance, or needs to be replaced, based on the electrical property data, optical property data, or the input data from the visual inspection system 88. For example, the surface monitoring system 82 may determine a color, a position of a peak in an optical spectrum of the corrosion detection coating 62, a change in resistance, and/or other properties as discussed herein, indicative of exposure of a mechanical component having the corrosion detection coating 62 to one or more fluids, such as water, H₂S, and CO₂. In some embodiments, the surface monitoring system 82 may determine a magnitude of the change in color.

As one non-limiting example of a use case, the surface monitoring system 82 may acquire optical property data of a corrosion detection coating 62 including a copper oxide (e.g., the inorganic particle 76) that has potentially been oxidized due to exposure to fluids as discussed herein. The optical property data may be an image of a portion of the corrosion detection coating 62 that includes an area (e.g., the portion 90) having a different color than a remaining area of the corrosion detection coating 62. In some embodiments, the surface monitoring system 82 may determine the substrate 64 has been exposed to fluids if the portion 90 of the corrosion detection coating 62 has a pixel value (e.g., RGB) of a particular color indicating that at least a portion of the copper in the portion 90 has oxidized. Additionally or alternatively, the surface monitoring system 82 may determine that the substrate 62 has been exposed to fluids if the dimensions of the portion 90 having a different color that the remaining area of the corrosion are above a dimension or area threshold. Additionally or alternatively, the surface monitoring system 82 may determine that the substrate 62 has been exposed to fluids if the brightness (e.g., white pixel value exceeds a background white pixel value threshold. In any case, the surface monitoring system 82 may compare the detected color, the detected dimensions of the portion 90, the white pixel value, or any combination thereof, to a reference color value (e.g., an RGB value indicating a color of the corrosion detection coating 62 including the inorganic particles 76 and metal particles 74), a reference area (e.g., a previously detected portion 90 showing oxidation or a threshold dimension), or a reference white or black pixel value stored in a memory (e.g., the memory 102) and determine a discrepancy between the detected value and the reference value. If the discrepancy exceeds a threshold (e.g., 10%, 20%, 30%, 40%, 50%, 60%, 70%, 80%, 90%, 100%), the surface monitoring system 82 may determine the substrate 64 has been exposed to fluids and proceed to block 146.

At block 146, the surface monitoring system 82 may generate a damage output (e.g., a mechanical component damage output and/or a sequestration component damage output). In general, the damage output may include an audible and/or visual alert (e.g., a notification displayed on a computing device, such as a laptop, mobile device, tablet, or otherwise) or cause a component of the mineral extraction system 108 (e.g., as discussed in FIG. 4) or the sequestration system 109 to modify operation. For example, the damage output may be a control signal or activation signal that causes a device utilizing the mechanical component coated with the corrosion detection coating 62 to stop operating or change operation or position. As another non-limiting example, the control signal may cause a drill to stop drilling, a valve to open or close, and/or a fluid flow rate to change. In some embodiments, the damage output may be an indication or alert displayed on a computing device, indicating a likelihood that a mechanical component (e.g., a fluid handling component, a mineral extraction component, a hydrocarbon extraction component, a sequestration component, or any combination thereof) has been exposed to fluids. In some embodiments, the notification may indicate a magnitude of the exposure (e.g., based on the change in the optical properties or electrical properties). For example, the alert may warn a user that the mechanical component was likely damaged as well as the extent of the damage (e.g., determined based on a magnitude change or the location of the change in optical and/or electrical properties) and/or a time period when the vehicle was likely damaged. In some embodiments, the surface monitoring system 82 may determine an estimated time period for subsequent use of the mechanical component (e.g., the mineral extraction component, the hydrocarbon extraction component, the sequestration component, or any combination thereof) coated with the corrosion detection coating 62 prior to inspection, repair, or replacement. For example, the surface monitoring system 82 may use a reference table (e.g., storing relationships between a magnitude of exposure and a time for replacement or maintenance) stored in a memory and the magnitude of the exposure to determine the estimate time period. As such, the surface monitoring system 82 may include the estimated time period in the notification or alert. This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising
providing a component having at least one coated surface comprising a material coating having a material composition, wherein the material composition comprises:
one or more polymeric materials;
one or more inorganic particles comprising oxides, carbonates, sulfides, or any combination thereof;
one or more metal particles configured to produce a detectable change in an optical property based on a reaction with at least one of H2O, CO2, or H2S; and
wherein the one or more inorganic particles and the one or more metal particles are dispersed within the one or more polymeric materials; and
wherein the one or more metal particles comprise copper or copper alloys, bismuth or bismuth alloys, or any combination thereof;
measuring data indicative of the optical property of the coated surface;
identifying the detectable change in the optical property in response to the data; and
outputting an indication of the detectable change.

2. The method of claim 1, wherein the material composition comprises hardening additives, lubricant additives, permeability control additives, or any combination thereof.

3. The method of claim 1, wherein the one or more polymeric materials comprise polyether ether ketone (PEEK), polyetherketone (PEK), polyphenylene sulfide, or any combination thereof.

4. The method of claim 1, wherein the one or more inorganic particles are configured to produce the detectable change in the optical property based on a reaction with $H_2S$ and $H_2O$, wherein the one or more inorganic particles comprise at least one of copper oxide, or cadmium oxide.

5. The method of claim 1, wherein the one or more inorganic particles are configured to produce the detectable change in the optical property based on a reaction with $CO_2$ and $H_2O$, wherein the one or more inorganic particles comprise a bismuth oxide.

6. The method of claim 1, wherein the one or more inorganic particles are configured to produce the detectable change in the optical property based on a reaction with $H_2O$, wherein the one or more inorganic particles comprise $B_2O_3$.

7. The method of claim 1, wherein the detectable change in the optical property comprises a darkening or a brightening of the material composition.

8. The method of claim 1, wherein the detectable change in the optical property includes one or more of a change in a color, a hue, a reflectance, a transmission, a polarization, an absorption, or a luminescent of the material composition.

9. The method of claim 1, wherein the material composition comprises at least 40% polymer by volume and less than or equal to 60% of the one or more inorganic particles and the one or more metal particles.

10. The method of claim 1, wherein the component is a downhole component.

11. The method of claim 1, wherein a thickness of the material coating is greater than or equal to 25 microns.

12. The method of claim 1, wherein the coated surface comprises a second material coating having a second material composition, the second material composition having differences in the one or more polymeric materials, the one or more inorganic particles, and/or the one or more metal particles.

13. The method of claim 12, comprising an electrically conductive layer disposed between the material coating and the second material coating.

14. The method of claim 13, wherein an area coverage of the conductive layer is less than approximately 10%.

15. The method of claim 1, comprising
measuring dimensions of an altered portion of the coated surface having a different color that a remaining area of the coated surface, and
outputting an alert if the dimensions of the altered portion exceeds a threshold.

16. The method of claim 1, wherein the component comprises a reference area and wherein the method further comprises comparing the data indicative of the optical property of the coated surface with data indicative of the optical property of the reference area.

17. The method of claim 16, wherein comparing the data indicative of the optical property of the coated surface with data indicative of the optical property of the reference area comprises comparing a detected color value of the coated surface with a reference color value of the reference area and determining a discrepancy between the detected value and the reference value.

18. The method of claim 17, comprising outputting an alert if the discrepancy exceeds a threshold.

* * * * *